(12) United States Patent
Filachek et al.

(10) Patent No.: US 11,636,139 B2
(45) Date of Patent: **\*Apr. 25, 2023**

(54) CENTRALIZED DATABASE SYSTEM WITH GEOGRAPHICALLY PARTITIONED DATA

(71) Applicant: INTERNATIONAL BUSINESS MACHINES CORPORATION, Armonk, NY (US)

(72) Inventors: Christopher Daniel Filachek, Lagrangeville, NY (US); Mark Richard Gambino, Brewster, NY (US); Daniel Howard Jacobs, Poughkeepsie, NY (US); Claire Durant, New Paltz, NY (US); Judy Marie Kearney, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,222

(22) Filed: Oct. 15, 2021

(65) Prior Publication Data
US 2022/0035844 A1 Feb. 3, 2022

Related U.S. Application Data

(63) Continuation of application No. 16/822,271, filed on Mar. 18, 2020, now Pat. No. 11,204,947.

(51) Int. Cl.
*G06F 16/00* (2019.01)
*G06F 16/29* (2019.01)
(Continued)

(52) U.S. Cl.
CPC ............ *G06F 16/29* (2019.01); *G06F 16/162* (2019.01); *G06F 16/1734* (2019.01);
(Continued)

(58) Field of Classification Search
CPC .. G06F 16/29; G06F 16/24573; G06F 16/273; G06F 16/162; G06F 16/182
(Continued)

(56) References Cited

U.S. PATENT DOCUMENTS

| 7,693,879 B2 | 4/2010 | Nishikawa et al. |
| 7,765,243 B2 | 7/2010 | Kedem |

(Continued)

FOREIGN PATENT DOCUMENTS

CN 107817948 A 3/2018

OTHER PUBLICATIONS

IBM: List of IBM Patents or Patent Applications Treated as Related (Appendix P); Date Filed: Oct. 15, 2021; 2 pages.

*Primary Examiner* — Alexandria Y Bromell
(74) *Attorney, Agent, or Firm* — Cantor Colburn LLP; Teddi Maranzano

(57) ABSTRACT

A computer-implemented method for storing documents in a centralized database system based on geographical data localization includes receiving, by a database manager, a request to update a document according to a data localization criterion, the document stored in a local storage device of the centralized database system. The method further includes determining, by the database manager, a geographical location for a local copy of the document based on an attribute of the document matching the localization criterion. The method further includes creating, by the database manager, a remote copy of the document on a storage device that is physically located in the geographical location. The method further includes modifying, by the database manager, the local copy of the document to include a location information of the remote copy.

18 Claims, 7 Drawing Sheets

(51) Int. Cl.
   *G06F 16/27*    (2019.01)
   *G06F 16/17*    (2019.01)
   *G06F 16/16*    (2019.01)
   *G06F 16/182*   (2019.01)
   *G06F 16/2457*  (2019.01)

(52) U.S. Cl.
   CPC ...... *G06F 16/182* (2019.01); *G06F 16/24573* (2019.01); *G06F 16/273* (2019.01)

(58) Field of Classification Search
   USPC ........................................................ 707/737
   See application file for complete search history.

(56) References Cited

U.S. PATENT DOCUMENTS

| | | |
|---|---|---|
| 9,396,275 B2 | 7/2016 | Sandholm |
| 10,331,710 B2 | 6/2019 | Couckuyt et al. |
| 2003/0187850 A1 | 10/2003 | Reed et al. |
| 2007/0067299 A1 | 3/2007 | Kozam et al. |
| 2009/0327339 A1 | 12/2009 | Berger et al. |
| 2014/0189432 A1* | 7/2014 | Gokhale ............ G06F 11/1464 714/41 |
| 2016/0110266 A1* | 4/2016 | Nara ................... G06F 11/1456 707/680 |
| 2016/0112407 A1* | 4/2016 | Nara .................... G06F 3/0647 726/5 |
| 2017/0168903 A1* | 6/2017 | Dornemann ........ G06F 11/2038 707/707 |
| 2017/0235647 A1* | 8/2017 | Kilaru ................ H04L 67/1095 707/652 |
| 2018/0285204 A1* | 10/2018 | Dwarampudi ........ G06F 11/302 707/707 |
| 2019/0087432 A1* | 3/2019 | Sion ....................... G06F 16/13 707/707 |
| 2021/0019237 A1 | 1/2021 | Karr et al. |
| 2021/0294822 A1 | 9/2021 | Filachek et al. |

* cited by examiner

CENTRALIZED DATABASE SYSTEM WITH GEOGRAPHICALLY PARTITIONED DATA

BACKGROUND

The present invention relates generally to computing technology, and more particularly, to a database management system that manages storing electronic documents in a database.

A centralized database system is a central computer system, that includes one or more of a desktop computer, a server computer, a mainframe computer, or a combination thereof, which is used by an organization (e.g. a business company) or an institution (e.g. a university), and the like to store data in a centralized manner, in a physical database that is in a single physical location. Users access the centralized database system through a computer network which is able to give them access to the central computer system.

SUMMARY

According to one or more embodiments of the present invention, a computer-implemented method for storing documents in a centralized database system based on geographical data localization includes receiving, by a database manager, a request to update a document according to a data localization criterion, the document stored in a local storage device of the centralized database system. The method further includes determining, by the database manager, a geographical location for a local copy of the document based on an attribute of the document matching the localization criterion. The method further includes creating, by the database manager, a remote copy of the document on a storage device that is physically located in the geographical location. The method further includes modifying, by the database manager, the local copy of the document to include a location information of the remote copy.

According to one or more embodiments of the present invention, a system includes a local storage device, several remote storage devices, and a database manager that performs a method for storing documents in a centralized database system based on geographical data localization. The method includes receiving a request to update a document according to a data localization criterion, the document stored in a local storage device of the centralized database system. The method further includes determining the geographical location for a local copy of the document based on an attribute of the document matching the localization criterion. The method further includes creating a remote copy of the document on a storage device that is physically located in the geographical location. The method further includes modifying the local copy of the document to include a location information of the remote copy.

According to one or more embodiments of the present invention, a computer program product includes a storage medium readable by one or more processing circuits, the storage medium storing instructions executable by the one or more processing circuits to cause a method for storing documents in a centralized database system based on geographical data localization to be performed. The method includes receiving a request to update a document according to a data localization criterion, the document stored in a local storage device of the centralized database system. The method further includes determining the geographical location for a local copy of the document based on an attribute of the document matching the localization criterion. The method further includes creating a remote copy of the document on a storage device that is physically located in the geographical location. The method further includes modifying the local copy of the document to include a location information of the remote copy.

Additional technical features and benefits are realized through the techniques of the present invention. Embodiments and aspects of the invention are described in detail herein and are considered a part of the claimed subject matter. For a better understanding, refer to the detailed description and to the drawings.

Figure 1:
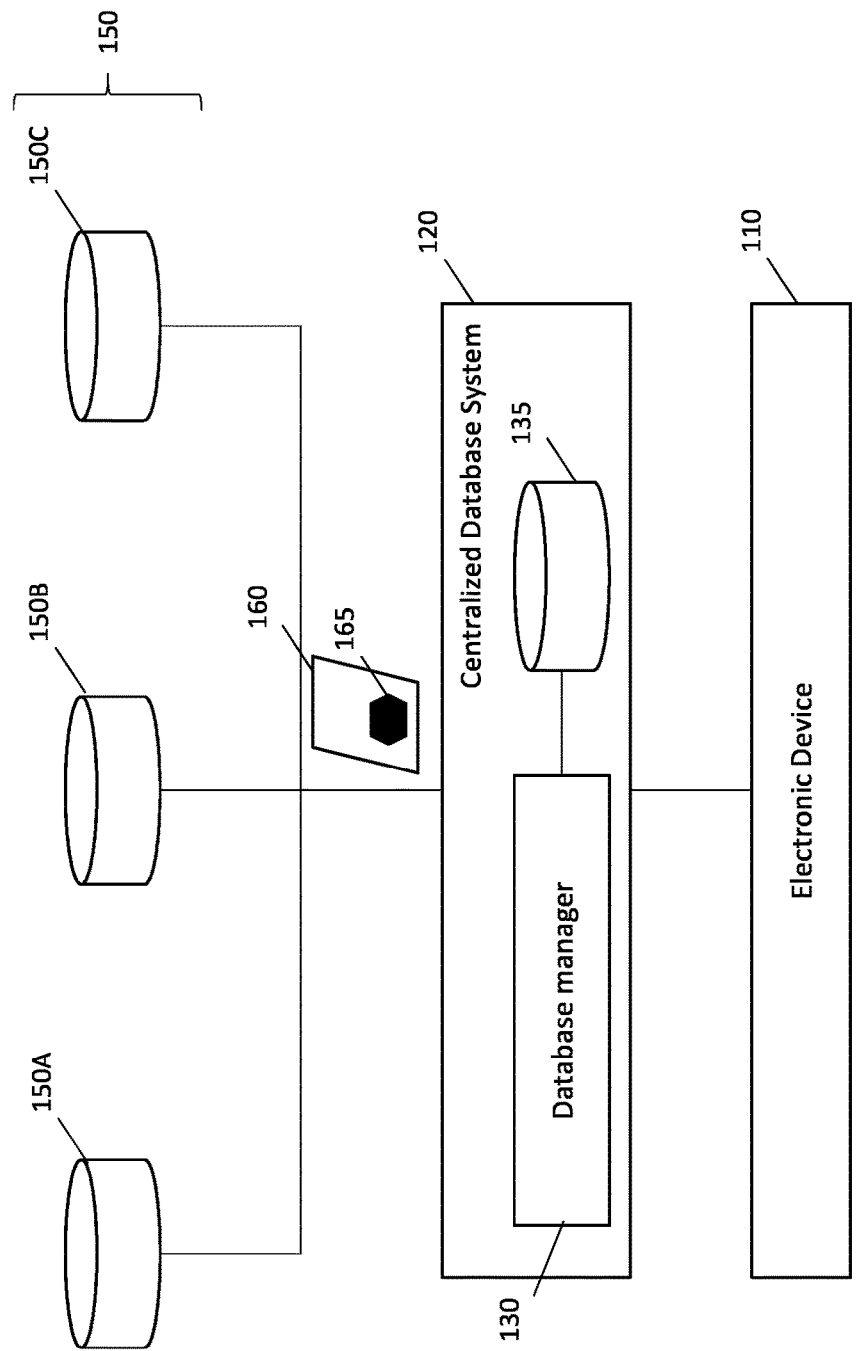
FIG. 1 is a schematic block diagram illustrating a centralized database system.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Example embodiments of the present invention relate to, among other things, devices, systems, methods, computer-readable medium, techniques, and methodologies for improving a centralized database system. Data localization or data residency laws restrict how data is accessed, processed, and/or stored by a centralized database system. A common aspect of these laws might require data owned by citizens and/or entities of a given country to be physically stored in that country. For example, data for customers from countries X and Y may need to be stored in their respective countries while data for all other customers can continue to be stored in storage disks located anywhere in the world. Some governments have already adopted data localization laws while others are in the process of creating or adopting these laws. Non-compliance with these laws can result in actions against companies, including fines or being forced to stop doing business in those countries.

Such data localization regulations pose technical challenges for organizations. For example, many global companies have computer systems, applications and databases that process and store information for customers and employees from around the world. These systems may separate or partition data for the sake of scalability or regional availability (for example, a data center in Germany for all European customers). However, these systems may not partition data in compliance with the data localization laws that can be more stringent. For example, the European data center may contain data from Russian customers despite Russian data localization laws requiring that such data be stored in storage devices that are physically in Russia. It is understood that location names used herein are examples, and that in one or more embodiments of the present invention, the locations can be different from those used herein.

Companies could partition their existing centralized database systems into geographically separate partitions or database servers to comply with the data localization laws. However, existing applications that use the centralized database systems may have been developed assuming a single, centralized database. Changing such applications to partition the database or even access multiple databases depending on the citizenship associated with a data record (e.g., a data record of a customer, an employee, etc.) can require changing the application extensively. For example, such changes may have to be made in every place in the application's source code where the application accesses (e.g., reads, updates etc.) the database. A partitioned database may also change fundamental assumptions about data consistency or access methods compared to a centralized database. This would require the company to re-architect their applications and comes with significant cost and risk.

Some centralized database systems have a concept of "zones", where a "zone" can be used to designate a geographic location. For example, MONGODB® supports "zones" where a zone can be used to represent a region or country. Zones are typically built on top of sharding support. Part of the shard key is used to determine which zone to store a document in. By creating such zones in specific regions or countries, a company can comply with data localization laws. However, such implementations can lead to several restrictions and limitations on the database system. For example, the fields used in the shard key are used to determine which zone and shard to use when storing or finding a document. Accordingly, these fields have to exist in all documents that contain a data record. If existing databases do not have a common set of fields across all documents that can be used as a zone field and address the needs of data localization, zones cannot be used without first updating the database to ensure that a common set of fields are defined across all documents.

Further, the fields used as the shard key may not be changed. In other words, if the citizenship field is used for the zone part of the shard key, then another field can't be used without an outage and database reorganization. In addition, using a combination of optional fields to define the zone is not possible. For example, it would not be possible to use the country code of the customer's home address for the zone if the citizenship field does not exist.

Another technical challenge is that if an operation does not include the complete shard key, then the database system must broadcast to all zones and shards to find the desired document. For example, if the shard key is the country code and document identifier (ID), then a query by just document ID would require a broadcast to find the document. However, many existing applications and indexes refer to documents simply by the document ID and would have to use the broadcast method when finding the document. In this scenario, a significant number of find or read requests would have to perform this broadcast operation. In a high volume system, the amount of broadcast operations required can reduce the performance and scalability of the database system. Accordingly, the application may still have to be redesigned to be aware of shards and zones as part of every read request.

Additionally, in the case of an existing database that is in a non-sharded or non-zoned configuration, an outage may be required to migrate the database to a sharded and/or zoned configuration prior to using the zones as described above in addition to redesigning the application.

Embodiments of the present invention address such technical challenges by facilitating a centralized database system that can comply with the data localization requirements without having to redesign and/or update existing applications entirely. In one or more embodiments of the present invention, the existing applications may not have to be changed at all. Embodiments of the present invention improve a document-based centralized database system by adding support for location information in each document. The location information is managed by a database manager and is separate from the application data in the document. By default, all documents are stored locally in the centralized database until the location information in the documents is provided. In one or more embodiments of the present invention, a user (which can be a customer, an employee, or any other user of the centralized database system) can set the location of a document using an interface, such as a graphical user interface, an application programming interface (API), and the like. In one or more embodiments of the present invention, the customers can provide such information as part of an update request. The location can be a symbolic representation of a remote data store that is known to the database manager. When the location name for a document is set, the database manager automatically stores the document in the remote data store that matches the requested symbolic representation. For example, if a customer application sets the location for a document to "Russia", then the database manager stores the document in the remote data store that is physically in Russia.

FIG. 1 illustrates a block diagram depicting a centralized database system according to one or more embodiments of the present invention. The depicted system 100 includes a centralized database system 120 that is in communication with an electronic device 110. The electronic device can be a desktop computer, a tablet computer, a server computer, a mainframe computer, a phone, or any other electronic device that can communicate via a communication network. The centralized database system 120 can be a mainframe computer, a server computer, a tablet computer, a desktop computer and other such computing devices. The centralized database system 120 can be a server cluster in one or more embodiments of the present invention. In one or more embodiments of the present invention, the centralized database system 120 can execute one or more applications that make database requests (e.g., read, update, delete etc.) to the database manager 130. Alternatively, or in addition, the electronic device 110 executes one or more applications that make database requests to the database manager 130 over a communication network (not shown).

In one or more embodiments of the present invention, the centralized database system 120 is a document database. A document database is a type of non-relational database that is designed to store and query data, such as JSON, or JSON-like documents. Embodiments of the present invention do not restrict the documents to be of any particular type, and can be stored and presented in a variety of ways, for example, binary, BSON, XML, JSON, data objects, etc. Document databases make it easier for developers to store and query data in a database by using the same document-model format they use in their application code. The flexible, semi structured, and hierarchical nature of documents and document databases allows such document databases to evolve with applications' needs. In one or more embodiments of the present invention, the individual data records (that are called "documents") in a document database, can include catalogs, user profiles, that are used by content management systems where each document is unique and evolves over time. Document databases enable flexible indexing, powerful ad hoc queries, and analytics over collections of documents.

The centralized database system 120 includes a database manager 130. The database manager 130 can be a computing device that includes one or more processing units. Alternatively, or in addition, the database manager 130 can be a software program or service. The database manager 130 manages the operations of the centralized database system 120 in one or more embodiments of the present invention. For example, the database manager 130 can parse one or more data requests from the electronic requests, both syntactically and semantically. The database manager 130 can further process the data requests, for example, to retrieve data and/or to store data.

In one or more embodiments of the present invention, the data is stored to, and retrieved from, a local storage device 135. Here, "local" indicates the same physical geographical location as the centralized database system 120. The local storage device 135 can include multiple storage disks, clusters, arrays, or any other data storage apparatus.

In addition, the centralized database system 120 is coupled via communication networks with one or more remote storage devices 150. It should be noted that each of the storage devices herein, such as the storage devices 150A, B, and C, is associated with a storage manager (not shown) to processes the document read/update/create/delete requests received from the centralized database system 120. In other words, each of the storage devices herein are not just disks, rather, also include modules that facilitate using such disks. Here, "remote" indicates that the storage devices 150 are physically located in separate geographical locations, such as different countries, from the centralized database system 120. The storage devices 150 are located in separate geographical locations so as to comply with the data localization laws. For example, a company can determine the geographical locations that need a storage device 150 based on where the company has customers, employees, and other business contacts that require compliance with local data localization laws. For example, a first company can have two storage devices, one in Germany and one in United States of America (USA), because those are the only two countries that require data localization among the countries where the first company does business. In another case, a second company that also does business in Germany and USA, and additionally in Russia, can have three storage devices, one in Germany, one in USA, and one in Russia.

Accordingly, a company can setup storage devices in different geographical locations that require the company to store data locally. In one or more embodiments of the present invention, the company can add or remove storage devices as the requirements change. In the example depicted in FIG. 1, the centralized database system 120 is coupled with three storage devices, 150A, 150B, and 150C, each in a distinct geographical location.

The database manager 130 determines where to store a document 160. The document 160 represents a single record in the centralized database system 120. In one or more embodiments of the present invention, the document 160 can include all of the data associated with a single entity, such as a customer, or an employee. Alternatively, or in addition, the data associated with a single entity can be split across multiple documents 160. A document 160 can include a symbolic representation 165 that specifies a geographical location at which the document 160 can be stored to be compliant with data localization laws. The symbolic representation 165 can be an address, a postal code, a country code, a phone number, location name, or any other such data that can identify a geographical location associated with the entity whose data is in the document 160. In one or more embodiments of the present invention, the symbolic representation 165 can be network related information associated with the entity, for example, an internet protocol (IP) address, a network identifier, an internet service provider identifier, or other such information that can be used to identify the geographical location of the entity. In one or more embodiments of the present invention, the symbolic representation 165 is used to determine a symbolic name of the remote storage device 150 to use for storing the document 160. For example, if a customer's phone number in the document 160 has a country code of "49" (which is Germany), then the symbolic name for the remote storage device is set to "Germany" (or any other name the represents the country code 49). Similarly, if a different customer has a mailing address with a country code of RU, then the symbolic name for the remote storage device 150 is set to "Russia".

In one or more embodiments of the present invention, the symbolic representation 165 is parsed from the data stored in the document 160. Alternatively, or in addition, the symbolic representation 165 can be provided separate from the data in the document 160, for example, in response to a request to the entity. The entity can send the symbolic representation 165 via an API of the centralized database system 120.

Figure 2:
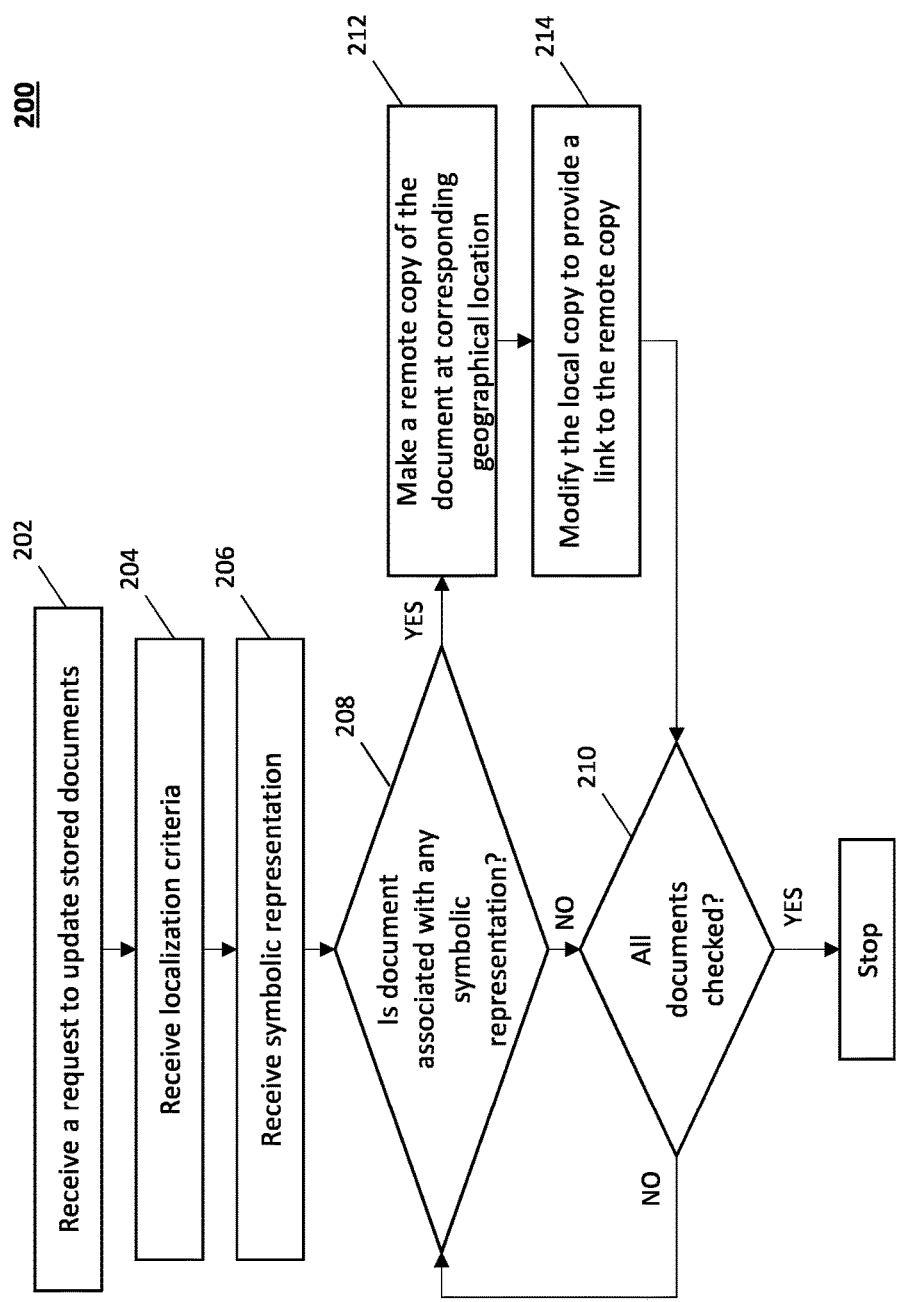
FIG. 2 depicts a flowchart of a method for storing documents in a centralized database system according to geographical localization regulations in accordance with one or more embodiments of the present invention.

FIG. 2 depicts a flowchart of a method for storing documents in a centralized database system according to geographical localization regulations in accordance with one or more embodiments of the present invention. The method 200 can be executed by an application on the electronic device 110 or the centralized database system 120. In the description below, operations of the method 200 are described as being executed by the centralized database system 120. However, a person skilled in the art can appreciate that the operations can also be executed by electronic device 110 in one or more embodiments of the present invention by sending/receiving corresponding requests to/from the centralized database system 120, where required. The method 200 includes receiving, by the database manager 130, a request/command to update the documents 160 that are stored in the centralized database system 120, at block 202. At this time, the documents 160 are not stored in compliance with data localization laws/regulations. For example, the documents 160 may be stored in storage disks at a single location.

The method 200 further includes receiving, by the database manager 130, a criterion to categorize the documents 160 to comply with the data localization laws, at block 204. The criterion can be received as part of the request. Alternatively, or in addition, the criterion can be received via a predetermined memory location. The criterion can specify one or more conditions. For example, the criterion can include a list of countries, states, or other geographical locations for which a document 160 has to be physically stored in that geographical location. For example, the criterion can be "Russia, India, Australia," which indicates that documents 160 that are associated with those countries have to be stored in those countries.

Further, the method 200 includes receiving, by the database manager 130, a symbolic representation 165 that can be used to identify geographical locations associated with the documents 160, at block 206. The database manager 130 can receive the symbolic representation 165 as part of the request to categorize the documents 160. Alternatively, or in addition, the symbolic representation 165 can be received from a predetermined memory location.

The symbolic representation 165 can include a country code, a phone number, a postal code/zip code, an address, or any other such data stored in the document 160. Alternatively, or in addition, the symbolic representation 165 can be based on the metadata of the document 160. For example, the metadata can include a network related identification of a source of the data stored in the document 160. The symbolic representation 165 can include a combination of the data and metadata of the documents 160. Other types of data and metadata, compared to those listed herein, can be used as the symbolic representation 165 in one or more embodiments of the present invention.

In one or more embodiments of the present invention, the symbolic representation 165 can include multiple symbolic representations. In one or more embodiments of the present invention, each geographical location can have a distinct symbolic representation 165. For example, a postal code is used as the symbolic representation 165 for documents 160 associated with a first geographical location, for example, Germany; while, a phone number is used as the symbolic representation 165 for documents 160 associated with a second geographical location, for example, Australia. Such a distinction can be made for several reasons. For example, those particular data fields may be ones that are mandatory to be filled for customers from those geographical locations. In the above example, customers from Germany have to fill their postal code (but not their phone numbers), while customers from Australia have to fill their phone numbers (but not postal codes). It is understood that this is just an example scenario and that in other embodiments of the present invention other combinations can be used for the symbolic representation 165.

The method 200 further includes, scanning each of the local documents 160 (that are stored in the centralized database system 120) to detect if a local document 160 is associated with any of the symbolic representations 165, at block 208. If a local document 160 is not associated with any symbolic representation 165, the local document 160 is not moved at this time, and the scanning continues until all local documents 160 have been checked, at block 210. Alternatively, if the local document 160 is associated with any a first symbolic representation 165, the database manager 130 makes a copy of the local document 160 on the first storage disk 150A at the geographical location, which is remote from the centralized database system 120, and is associated with the first symbolic representation 165, at block 212. The database manager 130 determines the geographical location associated with the first symbolic representation 165 based on the received symbolic representations (at 206), and further determines the storage disk 150A that is in that geographical location.

Further, the database manager 130 modifies the local copy of the document 160 to provide a link to the remote copy on the first storage disk 150A, at block 214. In one or more embodiments of the present invention, the local copy of the document 160 contains the access information of the remote copy of the document 160 and does not contain any of the application data in compliance with data localization laws. For example, the local copy stores a location information of the remote copy, where the location information contains a symbolic location name to identify the first storage disk 150A, a handle or document identifier that uniquely identifies the document 160 in the first storage disk 150A, and control information of the document 160. The control information can include access control for the document, such as user authorization. The method 200 processes all of the local documents 160 in this manner, at block 210.

In one or more embodiments of the present invention, the location information facilitates the database manager 130 to retrieve the application data when the electronic device 110 requests the application data from the document 160.

Figure 3:
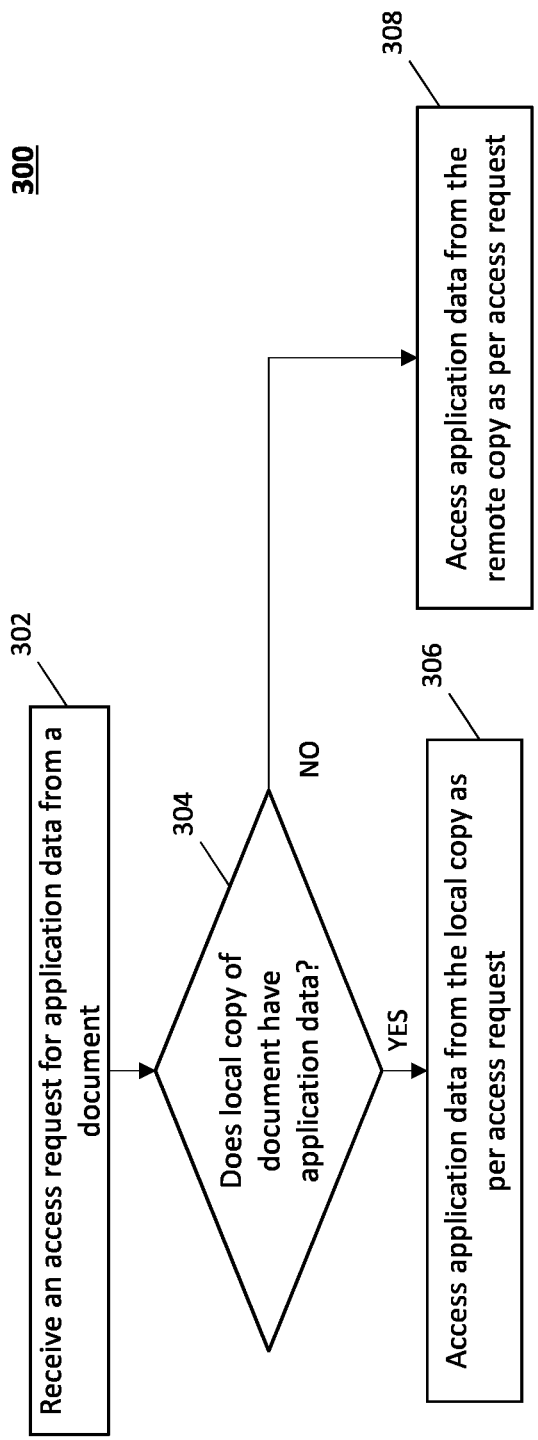
FIG. 3 depicts a flowchart of a method for accessing application data from a centralized database system that complies with data localization laws according to one or more embodiments of the present invention.

FIG. 3 depicts a flowchart of a method for accessing application data from a centralized database system that complies with data localization laws according to one or more embodiments of the present invention. The method 300 includes receiving an access request for application data from a document 160, at block 302. The access request can be to retrieve and/or update application data in the document 160. The database manager 130, in response, retrieves the local copy of the document 160. This can be performed using typical techniques that are already known or will be developed later.

The database manager 130 determines whether the retrieved local copy of the document 160 contains application data or location information for a remote copy of the document 160, at block 304. If the local copy contains application data, the database manager 130 completes the access request using the application data, at block 306.

If the database manager 130 finds location information in the local copy, then the database manager 130 deems that the document 160 is remote. Using the location information in the local copy (symbolic location name and document identifier), the database manager 130 reads the document 160 from the remote data store, for example, the first storage disk 150A and presents the application data to the application on the electronic device 110 as if the document 160 was read locally, at block 308. An application updates the document using the same methods it would use if the document was stored locally. When the access request is to update the document 160, the database manager 130, upon determining that the document 160 is stored remotely, automatically updates the remote copy of document 160 in the first storage disk 150A. Accordingly, method 300 facilitates the application to read and write from/to a remote copy of a document 160 the same way it would read and write to a local copy of the document 160. Thus, the database manager 130 can comply with data localization laws/regulations without making any changes to the application itself.

The only time the application on the electronic device 110 has to be aware of the geographical location of the document 160 is when the application sets the geographical location for the document 160. As noted earlier, the application can either set the geographical location for multiple documents 160 that are stored in the centralized database system 120 in a single request (FIG. 2), or for individual documents 160. The request can be sent via an API. Alternatively, or in addition, a separate application can provide such requests, independent of the original application that uses/creates the documents 160. In both cases, the document 160 is stored in a storage device 150 at the requested geographical location until the document 160 is deleted by the application or when the application sets a new geographical location for that document 160.

Figure 4:
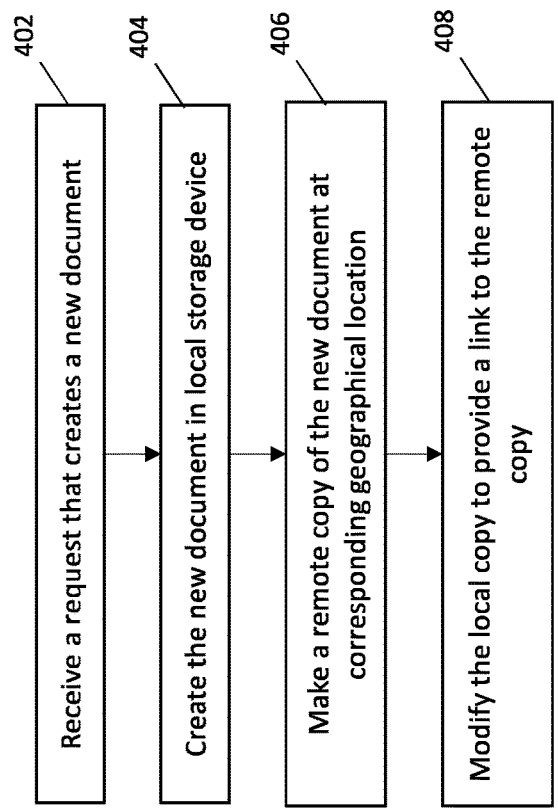
FIG. 4 depicts a flowchart of a method for storing incoming documents in a centralized database system according to geographical localization regulations in accordance with to one or more embodiments of the present invention.

FIG. 4 depicts a flowchart of a method for storing incoming documents in a centralized database system according to geographical localization regulations in accordance with to one or more embodiments of the present invention. The method 400 includes receiving a request that creates a new document 160 in the centralized database system 120, at block 402. For example, the request may be associated with a new customer, employee or other such entity. The request includes the symbolic representation 165 for the new document 160 to identify the geographical location for storing the new document 160.

In one or more embodiments of the present invention, the symbolic representation 165 can be explicitly included in the request as a separate parameter. Alternatively, or in addition, the symbolic representation 165 is identified by the database manager 130 based on one or more attributes associated with the data request itself, without having to modify the request from the application. For example, the database manager 130 identifies the symbolic representation 165 based on the network information, such as an IP address, associated with the received request. Alternatively, or in addition, the database manager 130 identifies the symbolic representation 165 by parsing one or more data/metadata attributes that are stored in the new document 160, such as address, phone number, etc.

The database manager 130 creates the new document 160 in the local storage device 135 of the centralized database system 120, at block 404. Once other operations of data access from the received request are completed, for example, reading/writing data, the database manager makes a copy of the document 160 in the first storage device 150A that is associated with the symbolic representation 165 that is associated with the new document 160, at block 406. Further, the database manager 130 modifies the local copy of the new document 160 to include a link to the remote copy in the first storage device 150A, at block 408. In addition to updating the local copy with the information to be able to find and access the remote copy at a later time, the application data (customer data, employee data, etc.) is deleted from the centralized database system 120 in compliance with the data localization laws. It is understood that the first storage device 150A is just an example, and that in other embodiments of the present invention, the new document 160 can be associated with the second storage device 150B, the third storage device 150C, and the like.

In one or more embodiments of the present invention, the document 160 may be updated multiple times before the application data in the document 160 is finalized. Hence, in one or more embodiments of the present invention, instead of storing the application data remotely, the database manager 130 saves a copy of the data locally, allowing subsequent reads/writes to work against the local copy. Depending on the number of reads/writes satisfied locally and the distance between the local and remote storage devices 150, the performance benefit can be significant. After a predetermined period of time or some other trigger, the database manager 130 automatically sends the application data from the local copy of the document 160 to the first storage device 150A and removes the application data from the local copy. Some data localization laws allow temporary local copies of data for "processing needs". For example, the period of time can include a predetermined duration since the new document 160 was created by the database manager 130, a predetermined duration since the request for creating the new document 160 was received, a predetermined duration since an access request to the new document 160 was received, and the like. Alternatively, or in addition, the trigger can include an explicit instruction from the application that the new document 160 has been completely updated, such as a "save" instruction.

Accordingly the application does not have to be aware of the physical geographical location of the document 160 and can continue to access the document 160 without any source code changes, and the database manager 130 can store/retrieve data in compliance with the data localization laws/regulations, transparent to the application.

One or more embodiments of the present invention improve the centralized database system and provide various advantages. For instance, the application can associate a geographical location for each individual document. Many existing centralized database systems may not contain citizenship or other information, which means the data does not exist to create proper shard keys. By allowing applications to set the location, documents can be easily moved to the required remote data storage devices as the necessary information is collected. In one or more embodiments of the present invention, the application can use data in other documents or databases to set the location for a given document. For example, an application could use information in a loyalty database to set the location in a travel reservation document.

In some cases, the application may have to be modified, however, setting the geographical location for a given document should only need to be done on a few isolated paths. For example, only when a document is first created or when specific types of data (citizenship, addresses, etc.) in the document are updated. These changes are minimal compared to re-architecting the entire application to manage location information across numerous application paths. For example, a separate user interface and function can be developed for such functionality, without any changes to the source code for the typical application operation.

Further, because the application determines the geographical location and does not rely on any configured or predefined shard key, any information may be used to determine the geographical location. For example, if citizenship is not immediately available, the application could use the country for the customer's home address or the IP address where the request originated from. In one or more embodiments of the present invention, a current location of the electronic device 110 can be used if the request is from a mobile device that includes a geographic positioning system (GPS) or other component that provides a geographical location (e.g., using network triangulation etc.).

Further yet, a local copy of a document is stored in the local storage device 135 of the centralized database system. Because of this, applications reading the document do not have to broadcast to all remote data storage devices looking for the document. Instead, the local copy of the document provides the location information necessary for the database manager to directly read the document from the correct remote data storage device without such broadcasts or additional queries.

Also, the database manager can continue to use the current database configuration in the case a geographical location is not provided, by storing the document in the local storage device 135. Thus, no downtime or outage is required to reconfigure or migrate the centralized database system, and the document can be moved to a remote data storage device if and when required.

Additional advantages of one or more embodiments of the present invention include that while the local copy is intended to only contain location information in compliance with data localization laws, the local copy, in one or more embodiments of the present invention, contains a copy of the application data for the sake of performance. In some use cases, a data localization regulation may require a copy of the data in a particular geographical location, but still allow a local copy of the document in the centralized database system. In such cases the database manager 130 can skip deleting the local copy of the data. In this case, there is always a local copy of the application data and the data is also stored in the remote data storage device.

Accordingly, one or more embodiments of the present invention provide an asynchronous update of one or more documents in the centralized database model to be in compliance with data localization laws/regulations. In one or more embodiments of the present invention, when the application creates or updates a document, the created/updated document is stored in the local storage device 135 with both the location information and the application data. In one or more embodiments of the present invention, only the location information is saved in the local copy. An asynchronous process reads the local copy of the document and creates/updates the document in the remote data storage devices. In one or more embodiments of the present invention, after the remote data storage device is updated, the asynchronous process updates the local copy of the document, this time containing only the location information in compliance with data localization laws. This asynchronous process allows applications to complete data requests more efficiently without having to wait for a response from the remote data storage devices. Delete operations are asynchronous as well, except there is no local copy of the document to be managed.

Figure 5:
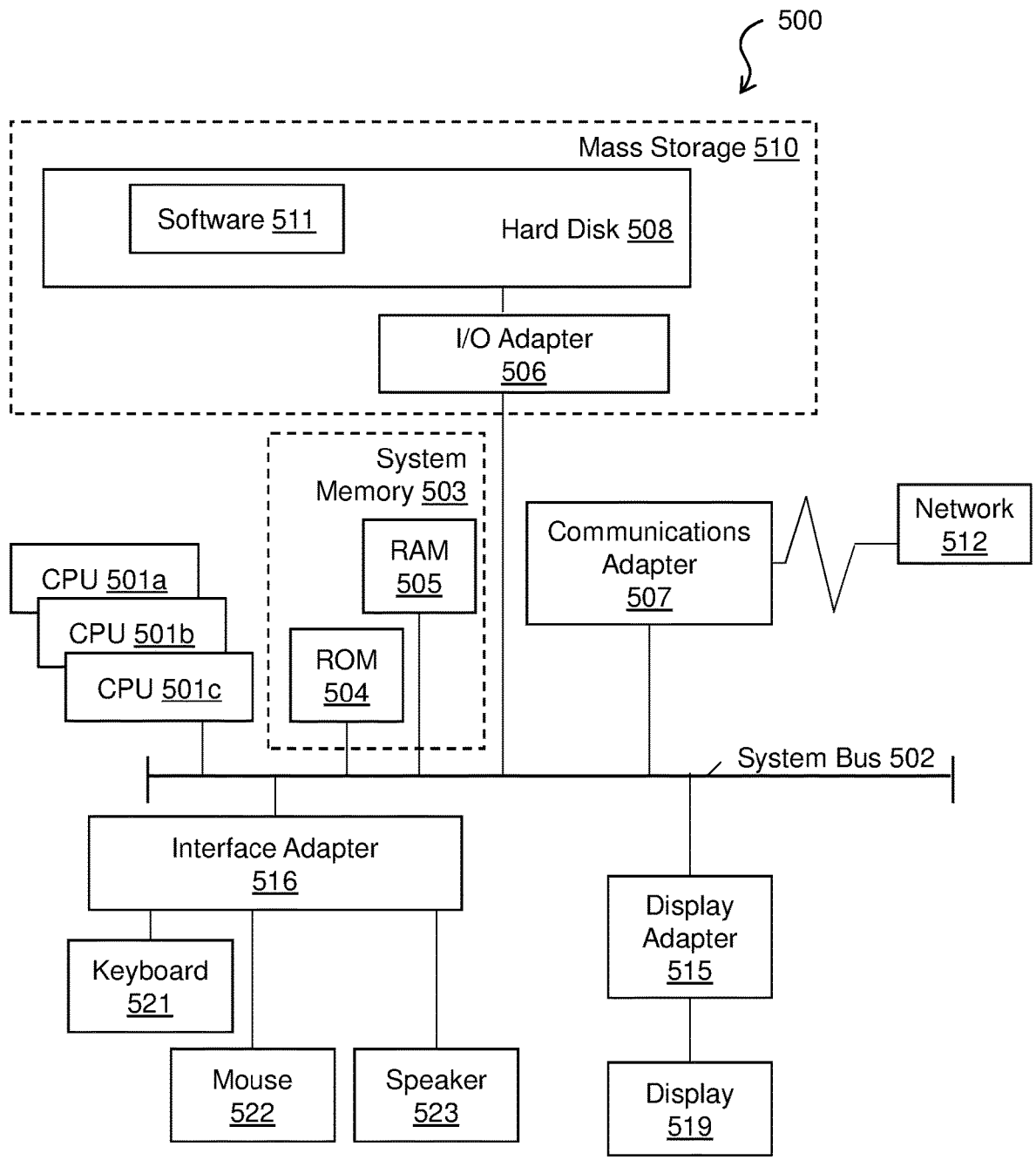
FIG. 5 is a schematic diagram of an illustrative computing device configured to implement one or more example embodiments of the invention.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage medium including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Illustrative methods in accordance with example embodiments of the invention and corresponding data structures (e.g., program modules) and components for performing the methods are described. It should be noted that each operation of the methods described herein, may be performed by one or more components depicted in drawings herein, such as in FIG. 1 or FIG. 5, whose operation are described in detail herein. In one or more embodiments of the present invention, program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

One or more operations of the methods described herein may be performed by one or more computing devices 500 having the illustrative configuration depicted in FIG. 5, or more specifically, by one or more program modules, engines, applications, or the like executable on such a device. It should be appreciated, however, that such operations may be implemented in connection with numerous other device configurations.

The operations of the methods described herein may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in the drawings may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
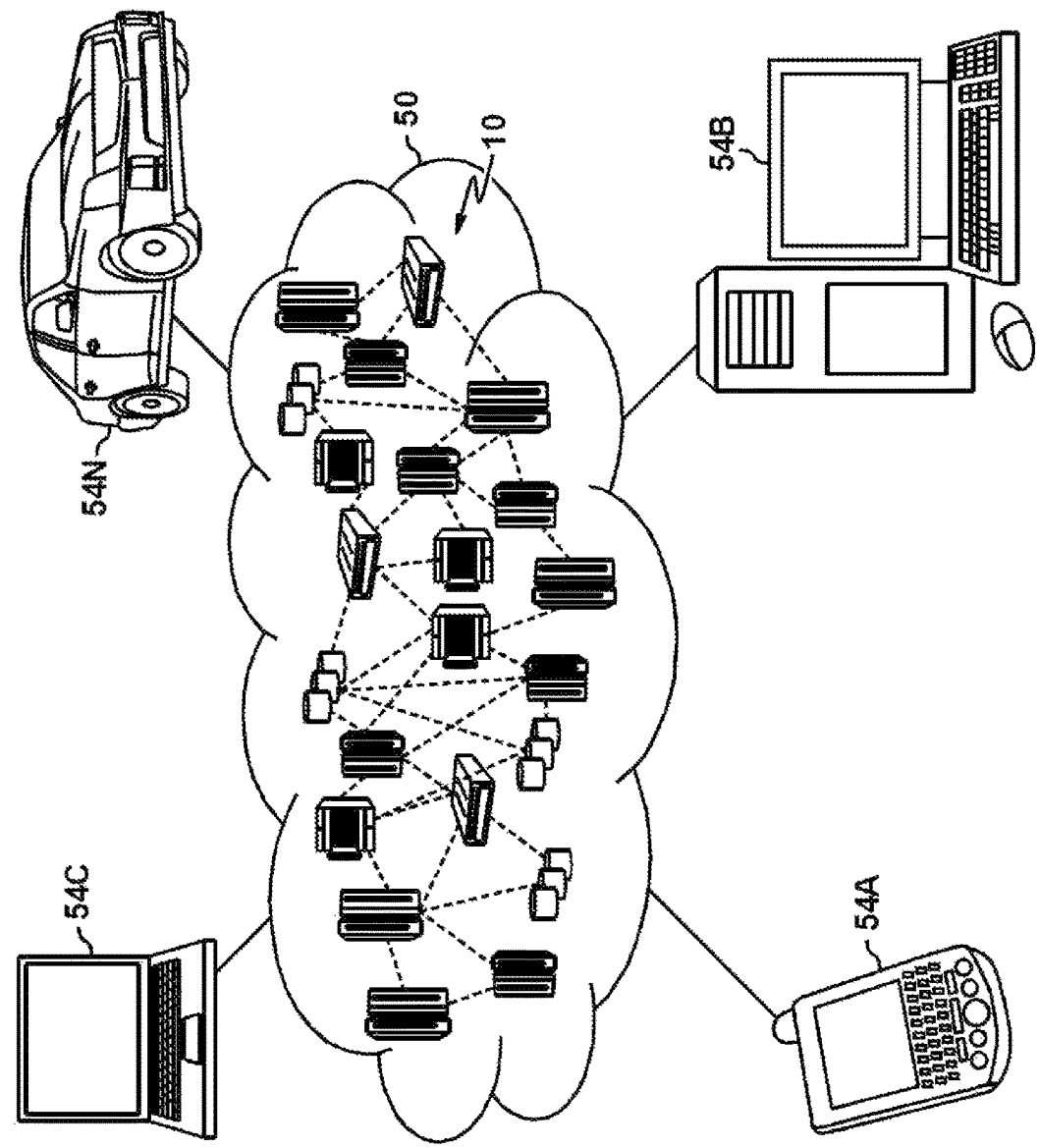
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
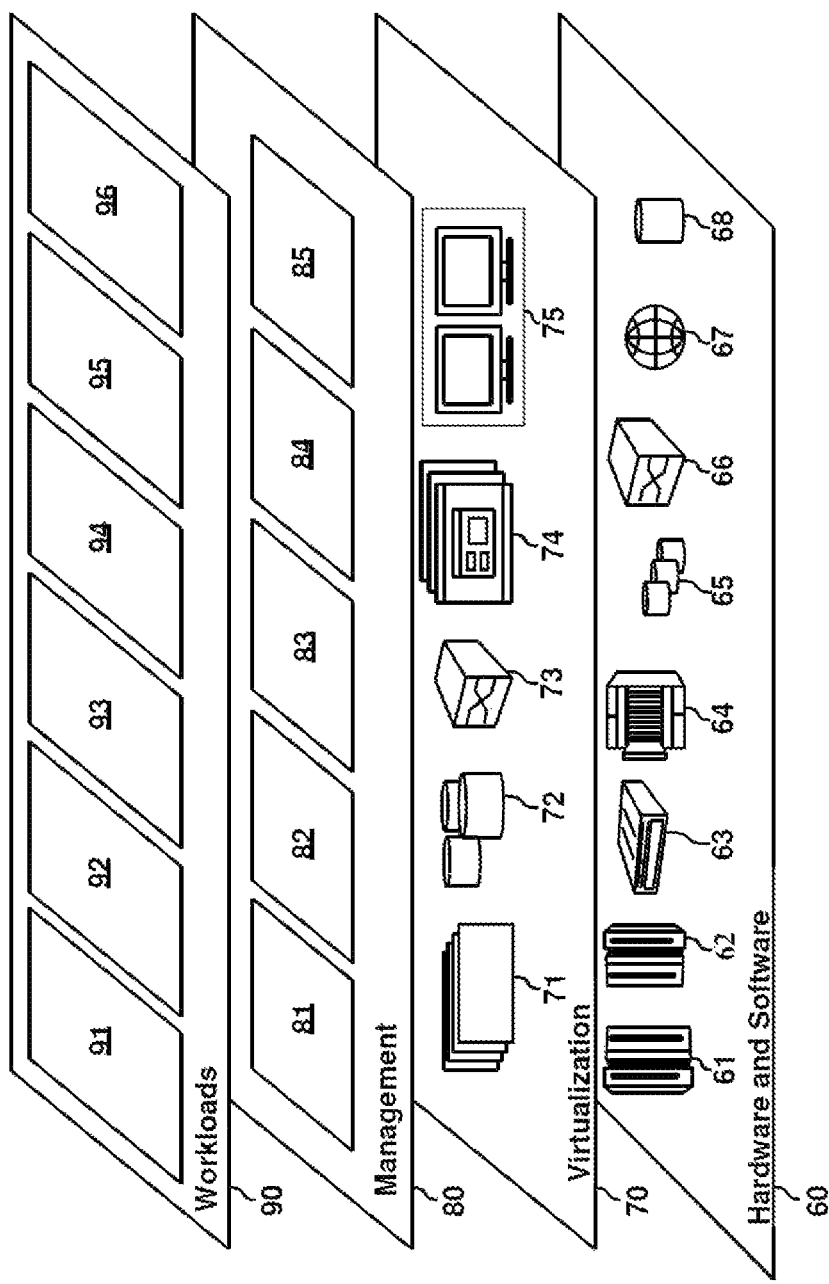
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for storing documents in a centralized database system based on geographical data localization, the method comprising:
   receiving, by a database manager, a request to create a document according to a data localization criterion;
   creating, by the database manager, the document in a local storage device of the centralized database system;
   determining, by the database manager, a geographical location for the document based on an attribute of the document matching the localization criterion;
   creating, by the database manager, a remote copy of the document on a storage device that is physically located in the geographical location, wherein the remote copy of the document includes a symbolic representation that corresponds to the geographical location; and
   modifying, by the database manager, the local copy of the document to include a location information of the remote copy, wherein the database manager asynchronously copies application data from the local copy to the remote copy before modifying the local copy.

2. The method of claim 1, wherein the geographical location of the storage device is distinct from a geographical location of the local storage device of the centralized database system.

3. The method of claim 1, wherein modifying the local copy further comprises, deleting, application data from the local copy so that the local copy only includes the location information.

4. The method of claim 1, wherein the database manager asynchronously copies the application data in response to a predetermined duration since the most recent access request for the local copy.

5. The method of claim 1, wherein the geographical location for the document is based on content of the document.

6. The method of claim 1, wherein the geographical location for the document is based on metadata of the document.

7. A system comprising:
   a local storage device;
   a plurality of remote storage devices; and
   a database manager that is configured to perform a method for storing documents in a centralized database system based on geographical data localization, the method comprising:
      receiving a request to create a document according to a data localization criterion;
      creating the document in a local storage device of the centralized database system;
      determining the geographical location for the document based on an attribute of the document matching the localization criterion;
      creating a remote copy of the document on a storage device that is physically located in the geographical location, wherein the remote copy of the document includes a symbolic representation that corresponds to the geographical location; and
      modifying the local copy of the document to include a location information of the remote copy, wherein the database manager asynchronously copies application data from the local copy to the remote copy before modifying the local copy.

8. The system of claim 7, wherein the geographical location of the storage device is distinct from a geographical location of the local storage device of the centralized database system.

9. The system of claim 7, wherein modifying the local copy further comprises, deleting, application data from the local copy so that the local copy only includes the location information.

10. The system of claim 7, wherein the database manager asynchronously copies the application data in response to a predetermined duration since the most recent access request for the local copy.

11. The system of claim 7, wherein the geographical location for the document is based on content of the document.

12. The system of claim 7, wherein the geographical location for the document is based on metadata of the document.

13. A computer program product comprising a storage medium readable by one or more processing circuits, the storage medium storing instructions executable by the one or more processing circuits to cause a method for storing documents in a centralized database system based on geographical data localization to be performed, the method comprising:
   receiving a request to create a document according to a data localization criterion;
   creating the document in a local storage device of the centralized database system;
   determining the geographical location for the document based on an attribute of the document matching the localization criterion;
   creating a remote copy of the document on a storage device that is physically located in the geographical location, wherein the remote copy of the document includes a symbolic representation that corresponds to the geographical location; and
   modifying the local copy of the document to include a location information of the remote copy, wherein the database manager asynchronously copies application data from the local copy to the remote copy before modifying the local copy.

14. The computer program product of claim 13, wherein the geographical location of the storage device is distinct from a geographical location of the local storage device of the centralized database system.

15. The computer program product of claim 13, wherein modifying the local copy further comprises, deleting, application data from the local copy so that the local copy only includes the location information.

16. The computer program product of claim 13, wherein the geographical location for the document is based on content of the document.

17. The computer program product of claim 13, wherein the geographical location for the document is based on metadata of the document.

18. The computer program product of claim 13, wherein the database manager asynchronously copies the application data in response to a predetermined duration since the most recent access request for the local copy.

* * * * *